United States Patent [19]

Beebe et al.

[11] Patent Number: 5,661,969
[45] Date of Patent: Sep. 2, 1997

[54] FUEL TRIM SYSTEM FOR A MULTIPLE CHAMBER GAS TURBINE COMBUSTION SYSTEM

[75] Inventors: Kenneth W. Beebe; L. Berkly Davis; Robert J. Iasillo, all of Schenectady, N.Y.

[73] Assignee: General Electric Co., Schenectady, N.Y.

[21] Appl. No.: 346,952

[22] Filed: Nov. 30, 1994

Related U.S. Application Data

[62] Division of Ser. No. 168,570, Dec. 16, 1993, Pat. No. 5,423,175, which is a division of Ser. No. 996,934, Dec. 30, 1992, Pat. No. 5,319,931.

[51] Int. Cl.⁶ .................................................. F02C 9/28
[52] U.S. Cl. ...................................... 60/39.281; 60/734
[58] Field of Search ............................ 60/39.281, 734

[56] References Cited

U.S. PATENT DOCUMENTS

| | | | |
|---|---|---|---|
| 4,949,538 | 8/1990 | Iasillo et al. | 60/733 |
| 5,365,732 | 11/1994 | Correa | 60/39.281 |

*Primary Examiner*—Louis J. Casaregola
*Attorney, Agent, or Firm*—Nixon & Vanderhye

[57] ABSTRACT

A fuel trimming unit has been adapted to each combustion chamber in a multi-chamber combustor of an industrial gas turbine. The fuel trim unit matches the combustion air flow into each combustion chamber. This adjusts the fuel-air mixture to account for air flow variations into the individual combustion reaction zones of each combustion chamber. Because of the fuel trim unit, a uniform fuel-air mixture is provided to each combustion chamber in a gas turbine. The fuel trim unit is adjusted using sensor inputs of the fuel flow rate to each combustion chamber, the dynamic pressure in each combustion chamber, and the turbine exhaust temperature.

5 Claims, 3 Drawing Sheets

FUEL TRIM SYSTEM FOR A MULTIPLE CHAMBER GAS TURBINE COMBUSTION SYSTEM

This is a divisional of application Ser. No. 08/168,570 filed on Dec. 16, 1993, now U.S. Pat. No. 5,423,175, which is a division of prior application Ser. No. 07/996,934, filed on Dec. 30, 1992 now issued U.S. Pat. No. 5,319,931.

FIELD OF THE INVENTION

This invention relates to fuel control systems for gas turbines. In particular, this invention relates to fuel trimming systems for industrial gas turbines having plurality of combustion chambers.

DESCRIPTION OF THE RELATED ART

Industrial gas turbines are required to perform at higher and higher efficiencies while producing less and less undesirable air polluting emissions. Higher efficiencies in gas turbines are generally achieved by increasing overall gas temperature in the combustion chambers of the the gas turbine. Emissions are reduced by lowering the maximum gas temperature in the combustion chamber. The demand for higher efficiencies which results in hotter combustion chambers conflicts to an extent with the regulatory requirements for low emission gas turbines.

The primary air polluting emissions produced by gas turbines burning conventional hydrocarbon fuels are oxides of nitrogen (NOx), carbon monoxide (CO) and unburned hydrocarbons (UHC). The oxidation of molecular nitrogen in gas turbines increases dramatically with the maximum hot gas temperature in the combustion reaction zone of each combustion chamber. The rate of chemical reactions forming oxides of nitrogen is an exponential function of temperature. The volume of NOx emissions can be very great even if the hot maximum temperature is reached only briefly. A common method for reducing NOx emissions is to lower the maximum hot gas temperature in the combustion chamber by maintaining a lean fuel-air ratio.

If the fuel-air mixture in a combustion chamber is too lean, then excessive emissions of carbon monoxide and unburned hydrocarbon occur. CO and UHC emissions result from incomplete fuel combustion. Generation of these emissions usually occurs where the fuel-air mixture excessively quenches combustion in the reaction zone. The temperature in the reaction zone must be adequate to support complete combustion or the chemical combustion reactions will be quenched before achieving equilibrium. Unfortunately, prematurely quenched combustion too often occurs in current low-NOx combustors that operate with fuel-air mixtures near the lean limit of flammability.

The rates of CO and UHC emission generation due to combustion quenching are non-linear functions of reaction zone temperature and peak sharply at the lean fuel-air ratio limit of flammability. To minimize CO and UHC emissions, the reaction zones of gas turbine combustors should have adequate fuel-air mixtures to avoid the lean limit of flammability. However, combustors must still operate with lean fuel-air mixtures to reduce NOx emissions. To balance the conflicting needs for reduced CO, UHC and NOx emissions, extremely precise control is required over the fuel-air mixture in the reaction zones of the combustors in an industrial gas turbine.

The fuel-air ratio in each combustion chamber of a gas turbine should be the same. A constant fuel-air mixture in each combustor allows the mixture to be maintained at the lean ratio that best reduces CO, UHC and NOx emissions. In addition, uniform fuel-air ratios among chambers ensures a uniform distribution of temperature among the combustors of a gas turbine. A uniform distribution of temperature and pressure reduces the thermal and mechanical stresses on the combustion, turbine and other hot stream components of the gas turbine. A reduction in these stresses prolongs the operational lives of combustor and turbine parts. Peak hot gas temperature in some combustion chambers (but not others) increases thermal stresses and reduces the strength of materials in the hotter high fuel-air ratio chambers and turbine parts immediately downstream of those chambers.

It has proven extraordinarily difficult to achieve truly uniform temperature and pressure distribution in multiple combustion chambers of industrial gas turbines. For example, the air flow distribution in combustion chambers is perturbed by variations in the components of the combustion chambers and their assembly. These variations are due to necessary tolerances in manufacturing, installation and assembly of the combustor and gas turbine parts. In addition, the air flow paths are irregular approaching the combustion system from the compressor and exiting at the combustor discharge to the turbine. These irregular paths affect the air flow through the combustor and cause a non-uniform air flow distribution in the combustors. For example, localized air flow resistance is caused by the lines for turbine bearing lube oil in the compressor discharge air flow path. The irregular air flow distribution among combustion chambers affects the fuel-air ratio differently in each combustion chamber. Variations in the air flow in each combustion chamber make it difficult to maintain constant fuel-air ratios in all combustion chambers.

Prior fuel systems for multiple combustion chamber industrial gas turbines provide uniform fuel flow distribution among the chambers. These systems have a common control that meters the same rate of fuel to each chamber. These systems do not trim the fuel flow to each combustion chamber to maintain a uniform fuel-air ratio in each chamber. Accordingly, these prior fuel systems cannot maintain a truly uniform fuel-air ratio in all combustion chambers when the air flow is not uniformly distributed among combustion chambers.

SUMMARY OF THE INVENTION

The present invention is a control system for trimming the fuel flow to each combustion chamber in a multiple chamber gas turbine combustion system. The fuel flow distribution among chambers is trimmed to match the air flow distribution to obtain a uniform distribution of fuel-air ratios among chambers. Optimal fuel trimming equalizes the fuel-air ratio in all chambers regardless of uncontrolled chamber-to-chamber variations in the air flow.

The control signals to the fuel trimming system are: (1) individual combustion chamber fuel flow rates, (2) individual combustion chamber dynamic pressure levels, and (3) gas turbine exhaust temperature distribution around the entire turbine discharge. These signals may be used individually or in combination to determine the optimum fuel flow distribution set by the trimming system. Conventional instrumentation for each combustion chamber is used to obtain these control signals for the fuel trimming system. These instruments are well known in the gas turbine industry and have proven reliable.

One embodiment of the invention is a gas turbine comprising a compressor, a multi-chamber combustor receiving pressurized air from the compressor, a turbine drivingly connected to the compressor and receiving exhaust from the combustor, a fuel system for providing fuel to each chamber of the multi-chamber combustor, where the fuel system trims the fuel to individual chambers to match the air flow to each chamber.

Similarly, the invention in another embodiment is a combustion section of a gas turbine having a plurality of chambers, at least one of the chambers comprising: at least one combustion reaction zone receiving air from a compressor and fuel from a fuel distributor; the fuel distributor having a fuel trim orifice and a fuel trim valve, the fuel trim valve for the at least one chamber being individually set to trim the flow of fuel to the chamber.

The advantages provided by the present invention include uniform distribution of fuel-air ratios among multiple combustion chambers to minimize the emissions of objectionable air pollutants in the gas turbine exhaust, including nitrogen oxide, carbon monoxide, and unburned hydrocarbons over the entire load range of a gas turbine. In addition, uniform distribution of fuel-air ratio prolongs the operational life of the hot stream components of the gas turbine.

An object of this invention is to provide a method for obtaining a uniform distribution of fuel-air ratio among all the combustion chambers of a multiple chamber combustion system in an industrial gas turbine. In particular, it is an objective to maintain a uniform fuel-air ratio in each chamber of a multiple chamber gas turbine combustion chamber system, when air flow is not uniformly distributed among the combustion chambers. It is a further objective of this invention to trim the fuel flow distribution among the combustion chambers to match variations in air flow to each chamber.

BRIEF DESCRIPTION OF THE DRAWINGS

The accompanying drawings contain reference numerals used in the following detailed description of an embodiment of the present invention.

DETAILED DESCRIPTION OF THE DRAWINGS

Figure 1:
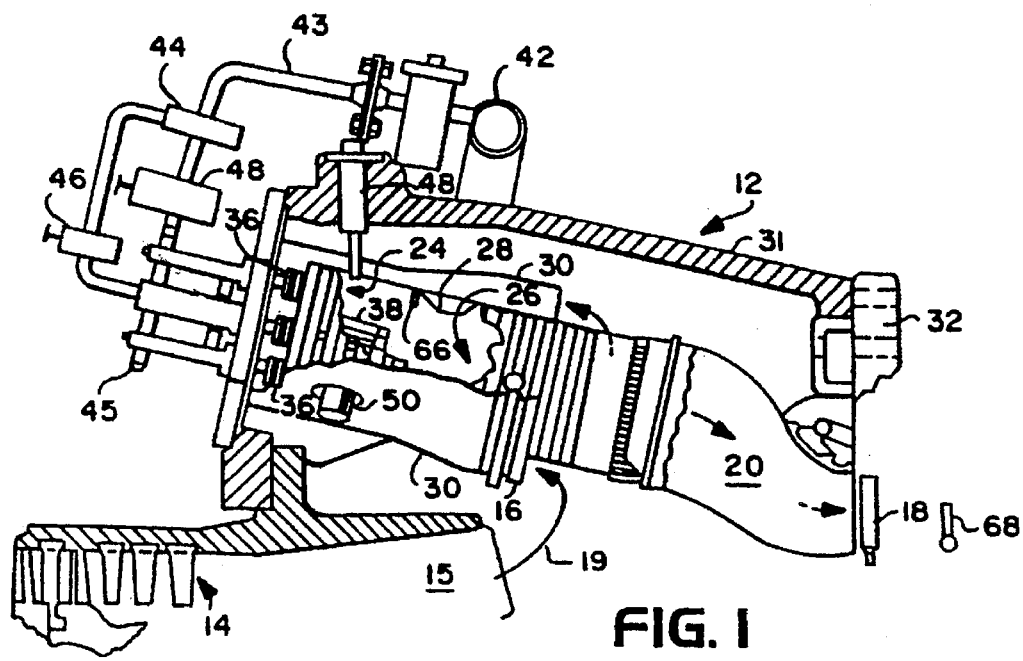
FIG. 1 is an elevation view of a gas turbine engine shown in partial cross section.

FIG. 1 shows a gas turbine 12 that includes a compressor 14, a compressor exhaust duct 15, multiple combustion chambers (one shown) 16 and a turbine 18 represented by a single blade. Although it is not specifically shown, it is well known that the turbine is drivingly connected to the compressor along a common axis. The compressor pressurizes inlet air is turned 19 to the combustor where it cools the combustor and provides air for combustion.

The plurality of combustion chambers 16 are located about the periphery of the gas turbine. In one particular gas turbine, there are fourteen chambers disposed about the periphery of the gas turbine. A transition duct 20 connects the outlet of a particular combustion chamber to the inlet of the turbine to deliver the hot products of the combustion process to the turbine.

The invention is particularly useful in a dual stage, dual mode low NOx combustor of the type described in U.S. Pat. No. 4,292,801. As described in that patent and shown in FIGS. 1 and 2, each combustion chamber 16 comprises a primary or upstream combustion reaction zone 24 and a secondary or downstream combustion reaction zone 26 separated by a venturi throat region 28. Each combustion chamber is surrounded by a combustor flow sleeve 30 that channels compressor discharge air flow to the chamber. The chamber is further surrounded by all outer casing 31 bolted to the turbine casing 32.

Primary fuel nozzles 36 deliver fuel to the upstream reaction zone 24 and are arranged in an annular array around a central secondary fuel nozzle 38. In one model gas turbine, each combustion chamber may include six primary nozzles and one secondary nozzle. Fuel is delivered to the nozzles from a centralized annular fuel manifold 42. From this manifold, fuel is piped 43 through a filter and to fuel distributors for the primary 24 and secondary 26 combustion reaction zones. The secondary distributor 44 routes fuel to the secondary fuel nozzle 38 and the primary distributor 45 is an annular piping unit that routes fuel to the primary nozzles 36.

Each distributor has an associated fuel trim unit. The secondary fuel trim unit 46 for the secondary distributor has an adjustable valve 60 operated by a technician. The technician reads sensor signals from pressure, temperature, and fuel flow rate sensors. A similar primary fuel trim unit 48 trims the fuel flow to the primary nozzles. Ignition in the primary combustion chamber is caused by a spark plug 48 and by adjacent combustion chambers through crossfire tubes 50.

Figure 2:
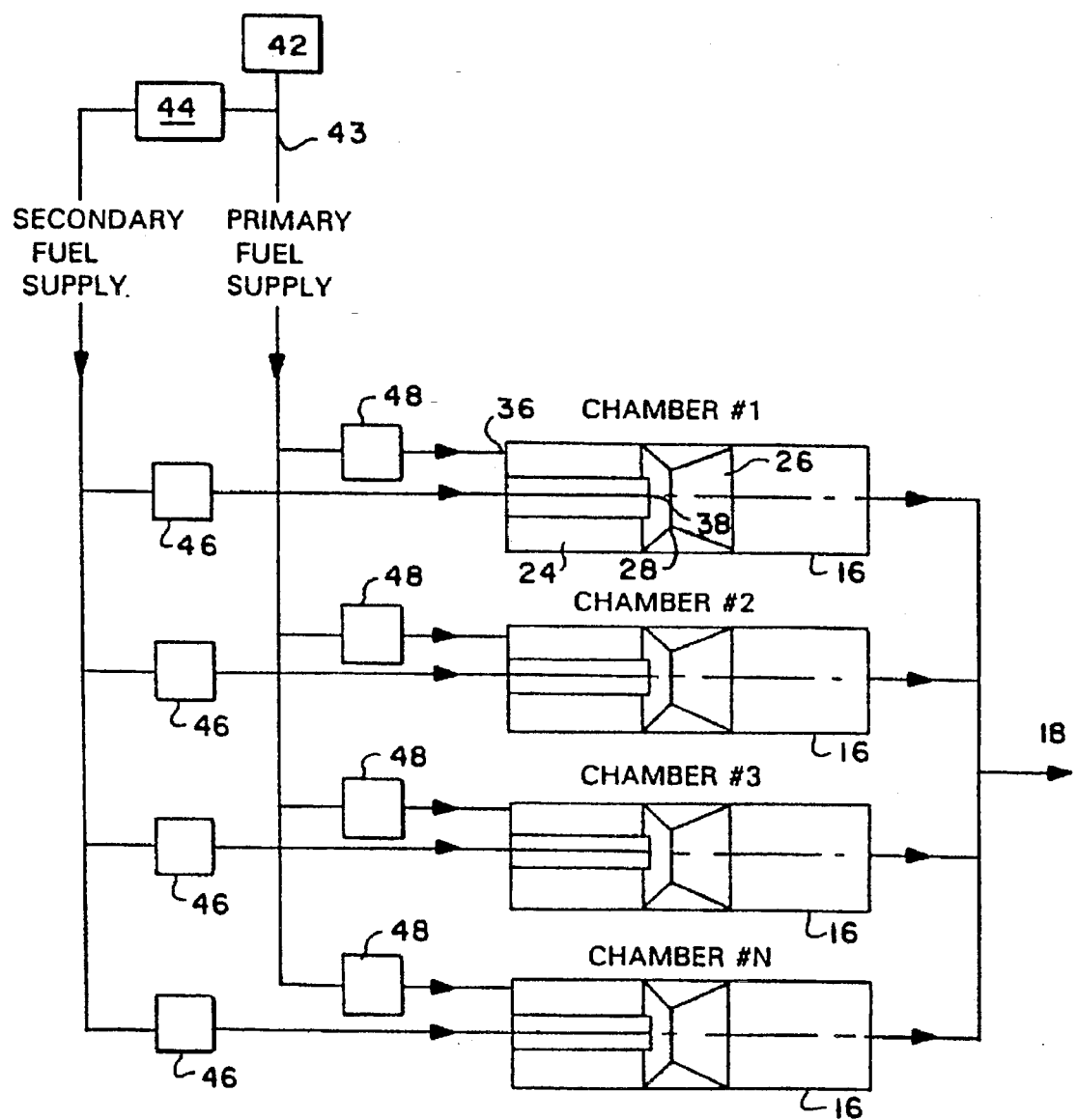
FIG. 2 is a block diagram of a fuel trimming system in accordance with the present invention.

FIG. 2 shows a fuel trim system as applied to a dual stage, dual mode low NOx combustion system as described in U.S. Pat. No. 4,292,801. The multiple combustion chambers 16 of a gas turbine combustion system are labeled chambers 1, 2, 3 to N, where N is the total number of combustion chambers in the combustion system. Combustion reactions occur in both the primary and secondary reaction zones in each chamber, either independently or in combination. Fuel and air are introduced into the reaction zones of the combustion chamber, combustion occurs, and fuel is oxidized releasing heat which results in a temperature and pressure rise in the combustion gases. In a typical application, the fuel is a hydrocarbon, such as methane, $CH_4$, end oxidation products of combustion to equilibrium are primarily carbon dioxide, $CO_2$, and water, $H_2O$. The combustion products are usually diluted with excess air provided as dilution air through the combustor from the compressor.

The distribution of hot gas temperature within the reaction zones 24, 26 of all combustion chambers 16 depends upon the fuel-air ratios in the reaction zones of each chamber. The distribution of hot gas temperature and pressure in the flow of combustion gases exiting the combustion chambers and entering the first stage of the turbine 18 depends upon the overall fuel-air ratio in each of the combustion chambers.

In general, the air flow rate will vary to each of the combustion chambers. The fuel flow to each reaction zone in each chamber is trimmed to account for the air flow variation. The fuel flow to each individual combustion chamber primary and secondary reaction zone is trimmed, i.e., raised or lowered, relative to the average fuel flow to all chambers. This trimming is accomplished by the fuel trim system 46, 48 that match the fuel flow to the air flow for each combustion chamber.

The technician adjusts the fuel flow rate to both the secondary and primary fuel nozzles in response to conditions monitored. This adjustment can be made at any time during operation of the gas turbine, but will usually be done at installation or during overhaul of the gas turbine. By trimming the fuel rate individually to each combustion chamber, the fuel flow rate can be matched to the individual air flow rate in each combustion chamber to maintain a constant fuel-air ratio in each chamber.

Figure 3:
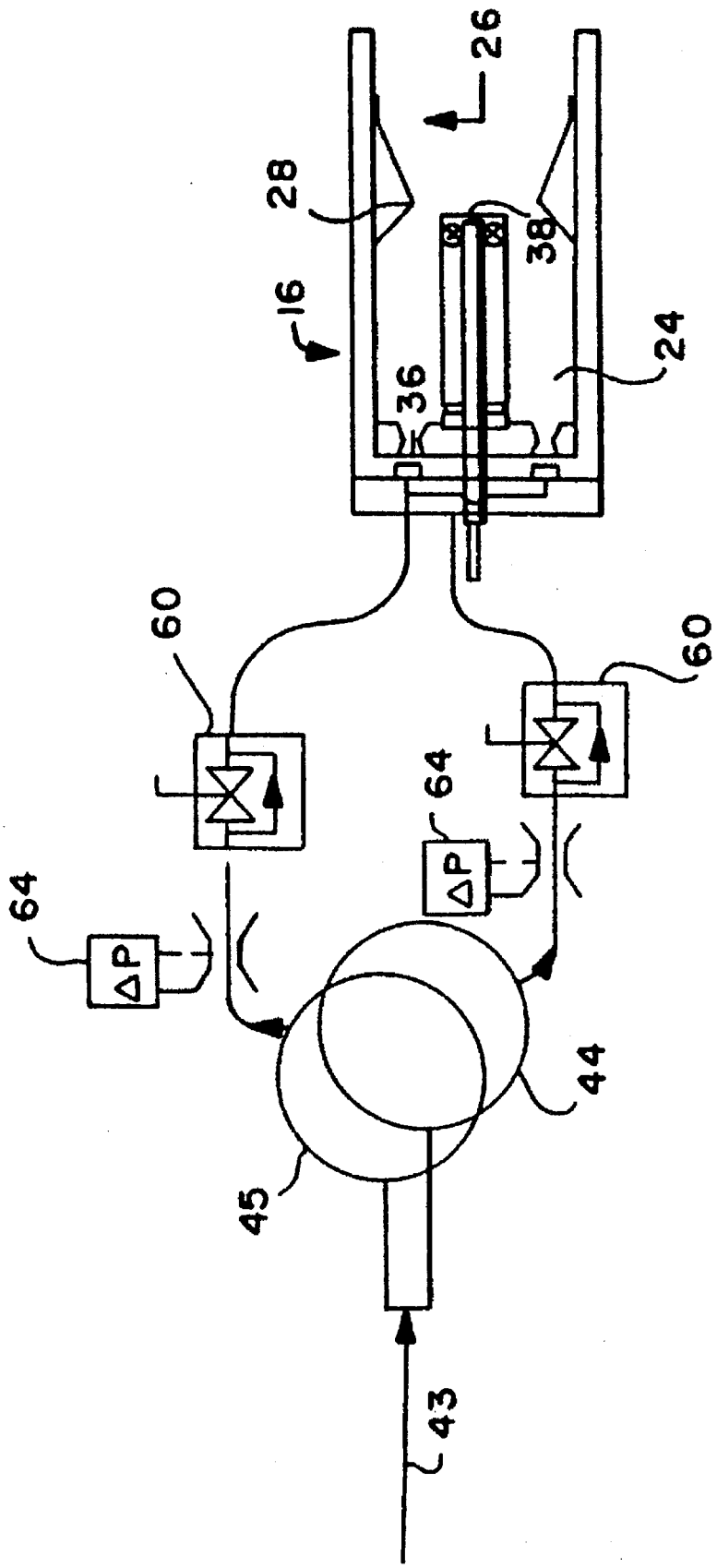
FIG. 3 is a schematic diagram of the instrumentation and control system for the fuel trim system shown in FIG. 2.

FIG. 3 shows a configuration for the fuel trim unit 46 or 48 for a single combustion chamber. A fuel trim control valve 60 adjusts the fuel flow rate to each reaction zone 24, 26 by varying the flow resistance of the fuel supply line to each zone of each combustion chamber.

The measured parameters used to set the fuel trim control valve are (1) measured fuel flow rate to each fuel trim system; (2) measured combustion chamber dynamic pressure, and (3) measured gas temperature distribution in the gas turbine exhaust. A technician monitors individual combustion chamber dynamic pressures, the distribution of gas turbine exhaust temperature and individual combustion chamber fuel flow rates.

A conventional fuel flow meter 64 is included in the fuel trim system to measure the fuel flow rate to each reaction zone in each combustion chamber. This measured fuel flow rate is used to maintain a desired fuel flow split between the primary and secondary reaction zones in each combustion chamber. The total fuel flow to each chamber and the fuel flow to each reaction zone is adjusted via valves 60 to match air flow distribution to the chamber.

A conventional dynamic pressure sensor 66 (FIG. 1) in each combustion chamber provides chamber pressure measurements that are displayed to the technician adjusting the fuel trim valves 60. Similarly, a conventional exhaust thermocouple array 68 (FIG. 1 shows just one thermocouple probe) provides the technician with data regarding the temperature distribution of exhaust gases exiting the turbine. Given the data from the pressure and temperature sensors and the fuel flow meters, a technician can adjust the fuel trim valves to each of the reaction zones to each combustion chamber. In this manner, the fuel flow to each reaction zone can be trimmed to maintain a uniform fuel-air mixture in all combustion chambers.

Figure 4:
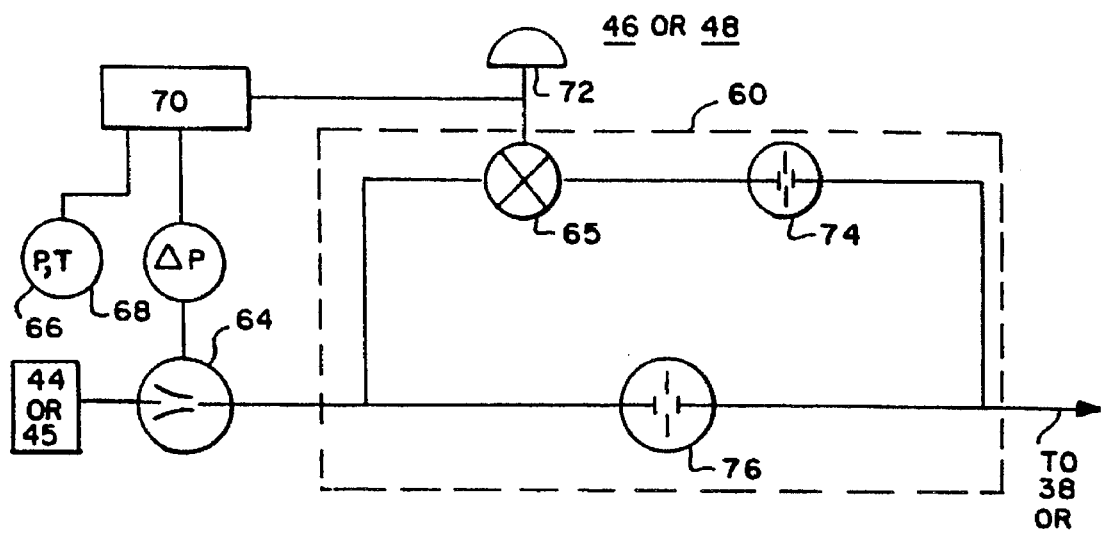
FIG. 4 is a schematic diagram of a computerized instrument.

FIG. 4 shows a detailed diagram of a fuel trim unit in an alternative embodiment where the fuel trim valves are under computer, rather than manual, control. A computer 70 monitors the sensor data to continuously trim fuel flow to maintain a uniform fuel-air ratio in each combustion chamber. In the manual method, the trim valves 60 are set to a fixed position at installation and may be adjusted during maintenance. This manual operating method suffices because the air flow distribution is not expected to change significantly over the life of the turbine. Thus, once the fuel flow is trimmed to match each chamber at installation of the gas turbine, it is reasonable to expect that the fuel-air match will be valid for the life of the gas turbine. However, continuous computer controlled fuel trimming could be desirable where truly exact fuel-air trimming is desired.

The computer controller 70 is a conventional controller such as the MARK V controller computer for industrial gas turbines sold by the assignee General Electric Company. The computer receives sensor data from the exhaust thermocouple array 68 and chamber dynamic pressure sensors 66. Similarly, the computer controller receives fuel flow rate data from the flow meters 64 for each reaction zone. Using the sensor inputs, the computer controller activates a solenoid 72 that adjusts the fuel trim valve 65.

The fuel trim valve 60 in both manual and computer controlled embodiments includes the trim valve 65 and a trim fuel orifice 74 in series and a parallel main fuel orifice 76. The parallel main and trim fuel orifices protect the gas turbine from unintentional extreme variations in fuel flow distribution among combustion chambers. If all fuel flowed through the fuel trim orifice, then extreme fuel variations might occur while the fuel flow is being trimmed to match air flow. The parallel main and trim orifices limit the maximum fluctuation of fuel flow due to the fuel trim unit.

The invention has been described as applied to a two stage low NOx combustion system. However, it could be applied to a single stage low NOx combustion system, a single stage conventional combustion system or any other gas turbine combustion system provided the system uses multiple combustion chambers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustion section of a gas turbine having a plurality of chambers, at least one of said chambers comprising:

at least one combustion reaction zone receiving air from a compressor and fuel from a fuel distributor;

said fuel distributor having a fuel trim orifice and a fuel trim valve, said fuel trim valve for said at least one of said chambers being individually adjustable to trim the flow of fuel to the chamber, and means to operate said fuel trim valve to regulate to the air flow to said chamber to maintain a selected fuel air-ratio in said chamber.

2. A combustion section as in claim 7 further comprising:

a pressure sensor detecting a dynamic gas pressure in the chamber;

a temperature sensor detecting an exhaust temperature of the combustion section, and a computer controller means for operatively adjusting the fuel trim valve in response to the dynamic gas pressure detected by the pressure sensor and the exhaust temperature detected by the temperature sensor.

3. A combustion section of a gas turbine having a plurality of chambers, at least one of said chambers comprising:

at least one combustion reaction zone receiving air from a compressor and fuel from a fuel distributor;

said fuel distributor having a fuel trim orifice and a fuel trim valve, said fuel trim valve for said at least one of said chambers being individually adjustable to trim the flow of fuel to the chamber;

a pressure sensor detecting a dynamic gas pressure in the chamber;

a temperature sensor detecting an exhaust temperature of the combustion section, and a controller means for operatively adjusting the fuel trim valve in response to the dynamic gas pressure detected by the pressure sensor and the exhaust temperature detected by the temperature sensor.

4. A gas turbine as in claim 1 wherein said fuel trim valve continuously adjusts the trim flow to individual chambers to match the air flow to each chamber.

5. A gas turbine as in claim 1 wherein each said combustor includes primary and secondary reaction zones and each member zone has an associated fuel control trim valve.

* * * * *